United States Patent Office 3,144,481
Patented Aug. 11, 1964

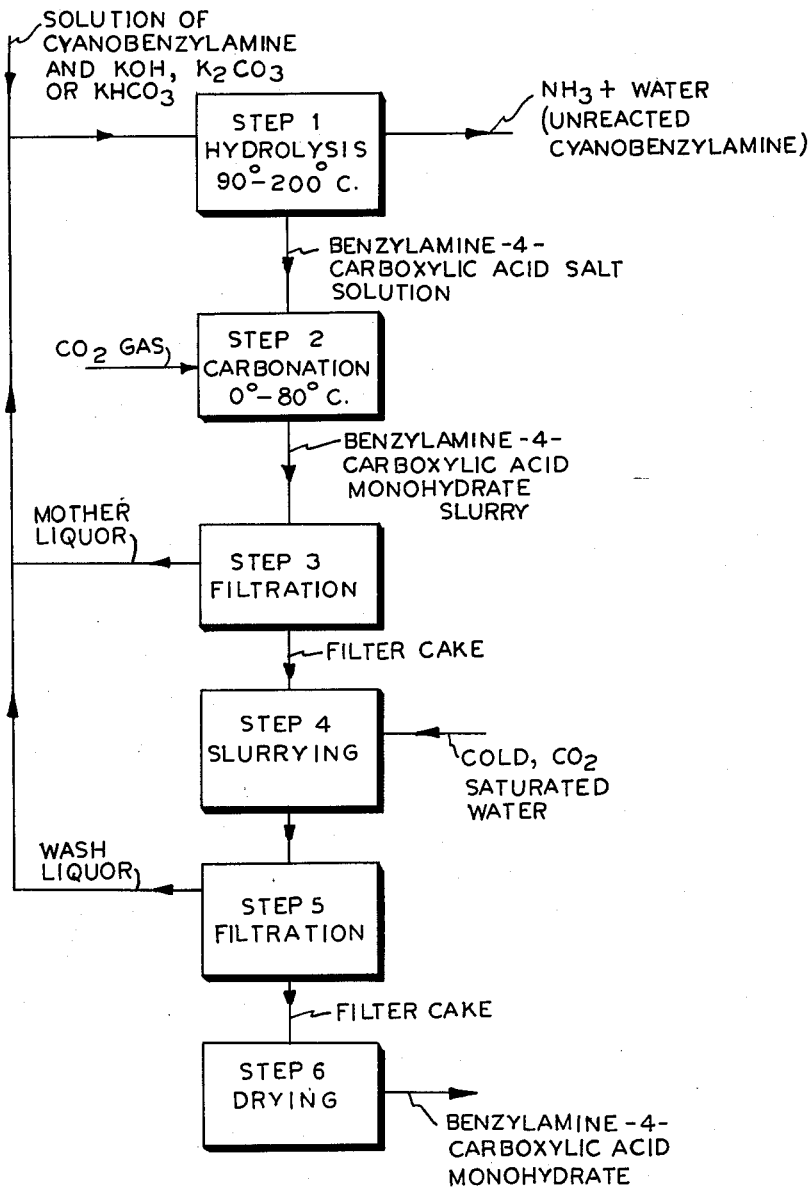

3,144,481
BENZYLAMINE CARBOXYLIC ACID
PRODUCTION
Edward W. Pietrusza, Morris Township, Morris County, and Richard E. Brown, Hanover Township, Morris County, N.J., assignors to Allied Chemical Corporation, New York, N.Y., a corporation of New York
Filed Aug. 16, 1960, Ser. No. 50,000
8 Claims. (Cl. 260—518)

This invention relates to processes for the production of benzylamine carboxylic acids by hydrolysis of a cyanobenzylamine in an aqueous solution of an alkali. Throughout this specification and claims the term "alkali" is used in its limited sense as designating the hydroxides and carbonates of sodium and potassium, i.e., sodium and potassium hydroxide, carbonate and bicarbonate. This invention also relates to processes for recovering the free benzylamine carboxylic acid from an aqueous solution of its sodium or potassium salt.

It is known to produce benzylamine-4-carboxylic acid by reducing 4-cyanobenzoic acid with hydrogen in the presence of ammonia and a suitable catalyst. The resulting solution is evaporated to obtain a crude benzylamine carboxylic acid. Other known methods involve a complicated series of steps, for example, reaction of potassium phthalimide and 4-cyanobenzyl chloride to form 4-cyanobenzyl phthalimide, caustic soda hydrolysis of the 4-cyanobenzyl phthalimide to the disodium salt of 4-carboxylbenzyl-2-phthalimide acid, and hydrochloric acid hydrolysis of the latter to benzylamine-4-carboxylic acid hydrochloride and orthophthalic acid.

It is known to produce other carboxylic acids by hydrolyzing the nitrile of the desired acid by heating it with an aqueous acid such as hydrochloric or sulfuric acid or with an aqueous solution of an alkali such as caustic soda or caustic potash. It is also known, however, the hydrolysis of the higher nitriles becomes increasingly difficult and, in general, aromatic higher nitriles are more difficult to hydrolyze than their aliphatic analogs. There is a tendency for the hydrolysis to proceed to the acid amide, stopping there unless vigorous hydrolysis conditions are employed, such as treatment with concentrated sulfuric acid or with a mixture of concentrated sulfuric acid and glacial acetic acid or sodium nitrite.

We have now found benzylamine carboxylic acids can be prepared from the corresponding cyanobenzylamine by hydrolysis even with relatively dilute, about 0.1-N, or more concentrated solutions up to about 10–N, aqueous solutions of an alkali of sodium or potassium, i.e. sodium or potassium hydroxide, carbonate or bicarbonate, or mixtures of these alkalies. We have further discovered that by carbonating the solution of the alkali metal salt of the benzylamine carboxylic acid produced by this alkaline hydrolysis of the cyanobenzylamine, the free benzylamine carboxylic acid is formed and can be precipitated from the carbonated solution while leaving the bicarbonate of the alkali metal in solution in the water. The benzylamine carboxylic acid separated from the mother liquor containing the alkali metal bicarbonate, may thus be obtained in high yields.

In operating in accordance with our invention a solution of a cyanobenzylamine in about 0.1-N or stronger aqueous solution of sodium or potassium hydroxide, carbonate or bicarbonate, preferably in 0.5-N to 5-N solution of the alkali, is prepared containing 0.5 to 10, preferably 1 to 2, equivalents of the alkali metal for every 1 mole of the cyanobenzylamine. The solution of the cyanobenzylamine and the alkali is heated at about 90° to about 200° C. The pressure on the solution can be substantially atmospheric or higher, including the autogenous pressure, developed in a closed reactor by the heated solution. Preferably the solution is heated under its autogenous pressure at temperatures of about 130° to about 150° C.

Under the foregoing conditions we have found the cyano group of the cyanobenzylamine is readily hydrolyzed to liberate ammonia and form a solution of the alkali metal salt of the benzylamine carboxylic acid. When it is desired to obtain a maximum conversion of the cyanobenzylamine to the alkali metal salt of the amino acid, ammonia is removed from the solution in the course of heating the solution to hydrolyze cyanobenzylamine. The ammonia may be vented from the reaction vessel in which the solution is heated under pressure. It may be removed by stripping the solution with steam or other inert gas or by distilling the solution.

The solution of alkali metal salt of the benzylamine carboxylic acid thus produced, is carbonated with carbon dioxide gas to precipitate the amino acid. The alkali metal salt is thus converted into the amino acid and the bicarbonate of the alkali metal. Due to its low solubility in the carbonated solution, benzylamine carboxylic acid precipitates from solution and is separated from its mother liquor containing the alkali metal carbonate. This carbonation of the solution of sodium or potassium salt of the benzylamine carboxylic acid is preferably carried to the point at which the solution is saturated with carbon dioxide under at least 1 p.s.i.g. $CO_2$ gas at a temperature of from 0° to 80° C., better yet at a temperature of 10° to 25° C. and about 100 to about 200 p.s.i.g. $CO_2$ gas.

The precipitated amino acid is filtered off and recovered as a crude benzylamine carboxylic acid. Preferably it is washed by slurrying the crude acid in a cold, saturated solution of carbon dioxide in water and filtering or otherwise separating the amino acid from the wash liquor. A large part of the impurities present are thus removed to give a product of substantially higher benzylamine carboxylic acid content. The benzylamine carboxylic acid products obtained in either manner may be further purified by, for example, recrystallization from solution in water.

When low ratios, e.g. about 0.5/1, of equivalents of alkali metal to moles cyanobenzylamine are present in the step of hydrolyzing the cyanobenzylamine, the solution of alkali metal salt of benzylamine carboxylic acid before carbonation may contain some solid benzylamine carboxylic acid. This benzylamine carboxylic acid will be recovered together with that precipitated by the carbonation of the solution.

The mother liquor, and preferably, also the wash liquor separated from the benzylamine carboxylic acid in carrying out the aforedescribed process are concentrated to remove any excess water, and together with make-up cyanobenzylamine and, as needed alkali to replace that withdrawn in the product and otherwise lost from the process, can be used in making up a reaction mixture which is heated to hydrolyze the cyanobenzylamine to produce additional amino acid. While an alkali of either sodium or potassium, i.e., caustic soda or caustic potash or a carbonate of these alkali metals, can be employed in preparing the aqueous alkali solution in which a cyanobenzylamine is hydrolyzed to the amino acid, the solubility relationship of the benzylamine carboxylic acid and the potassium bicarbonate formed in carbonating the hydrolyzed reaction product to precipitate the amino acid, favor the use of potassium hydroxide or one of the carbonates of potassium in the initial reaction mixture in which the cyanobenzylamine is hydrolyzed. Because of the higher solubilities of the potassium carbonates in the aqueous reaction mixture than is the case for the corresponding sodium compounds, more concentrated solutions of the potassium salt of the benzylamine carboxylic acid may be prepared and the acid more conveniently precipitated by carbonation of the reaction product than when sodium hydroxide or one of its carbonates is employed.

The accompanying drawing is a flow diagram of a recycle process embodying our invention for the production of benzylamine carboxylic acid from the corresponding cyanobenzylamine. The following Example 1 describes a procedure for operating in accordance with our invention employing the steps shown in the drawing.

*Example 1.*—An initial charge of 1 mole weight of p-cyanobenzylamine dissolved in a water solution of potassium carbonate containing 1 mole weight of $K_2CO_3$ in 750 weight parts of water is prepared. This corresponds to a solution of about 2.7-N potassium carbonate. It contains 2 equivalents of the alkali metal for every 1 mole of the p-cyanobenzylamine. In hydrolysis Step 1 of the drawing, this reaction mixture is heated for 5 hours in a closed autoclave provided with a stirrer at 130°–135° C. under the autogenous vapor pressures of the reaction mixture at those temperatures, which pressures range from about 40 to 60 p.s.i.g. The autoclave is vented to about atmospheric pressure and about ⅓ of the water initially supplied, accompanied by ammonia formed by hydrolysis of the cyano compound, is distilled from the reaction mixture over a period of about 1 hour. The autoclave is then flushed with nitrogen gas to remove the ammonia present in the gas space. After thus removing the free ammonia from the reaction mixture, the autoclave is again closed and the reaction mixture heated for an additional hour at 135°–140° C. under its autogenous vapor pressure to insure maximum conversion of the cyanobenzylamine to the benzylamine carboxylic acid.

The reaction product thus obtained is essentially an aqueous solution of the alkali metal salt of benzylamine-4-carboxylic acid. It is cooled to about 25° C. and in Step 2 is vigorously agitated while carbon dioxide under pressures of about 115 p.s.i.g. to about 195 p.s.i.g. is passed into the solution until the pressure of carbon dioxide remains substantially constant at about 185 p.s.i.g. During this introduction of carbon dioxide, as the alkalinity of the solution is reduced, benzylamine-4-carboxylic acid monohydrate precipitates, and as the carbonation continues a white slurry of this monohydrated amino acid is formed. This slurry is filtered in Step 3. In Step 4 the filter cake is slurried in cold (5° C. to 10° C.) water saturated with carbon dioxide under atmospheric pressure. This wash water is employed in amount about equal to that of the water distilled from the reaction mixture to concentrate it and strip it of ammonia. The slurry is filtered in Step 5 and in Step 6 the filter cake is dried in air at about 40°–50° C. to constant weight and is withdrawn as the crude benzylamine-4-carboxylic acid monohydrate product of the process.

In carrying out the hydrolysis step of this example, some unreacted p-cyanobenzylamine was vaporized and carried out of the reactor with the ammonia and water vapor removed from the reaction mixture in Step 1. By condensing the evolved vapors and fractionally distilling the condensate, a distilland containing this p-cyanobenzylamine freed of ammonia was recovered. The mother liquor and wash liquor from Steps 3 and 5, after heating them to remove the free carbon dioxide, together with this distalland containing p-cyanobenzylamine, with make-up p-cyanobenzylamine and added potassium carbonate and water as required to maintain the desired 2 equivalents of the alkali metal for every 1 mole of p-cyanobenzylamine and the desired concentration of the reagents, were introduced into Step 1. The reaction mixture thus prepared was heated to hydrolyze the cyanobenzylamine, the resulting solution of the salt of benzylamine-4-carboxylic acid was carbonated and the monohydrate of the acid was recovered as aforedescribed.

Over a period of operating the process of this example, the reaction mixture initially prepared and a total of 4 charges of make-up p-cyanobenzylamine with the mother liquor, the wash liquor and the distilland containing recovered p-cyanobenzylamine from the previous run were supplied in succession to hydrolysis Step 1. This was followed by adding potassium carbonate but no make-up cyanobenzylamine to the final mother liquor, wash liquor and distalland and returning this mixture to the hydrolysis step and recovery of benzylamine carboxylic acid monohydrate from the resulting solution. There was thus obtained about a 94% overall yield of the benzylamine carboxylic acid monohydrate. Of the six batches of the benzylamine carboxylic acid monohydrate product recovered, four had melting points of 350° C. or higher, amounting to about 65% of the total recovered product. One melted at 345–48° C., amounting to 13.8% of the total product and the final batch melted at 340° C., amounting to 20.8% of the total product.

In this and in the other examples given in this specification, the yields are in percent of theory based on the cyanobenzylamine supplied and the recovered benzylamine carboxylic acid product.

While the alkali supplied to the process in Example 1 was in the form of $K_2CO_3$, that in the recycled mother liquor and wash liquor was principally in the form of $KHCO_3$ due to conversion of carbonate to bicarbonate by the carbonation of the reaction product to precipitate the amino acid. Accordingly, the alkali can just as well be supplied to the process in the form of caustic potash or potassium bicarbonate, employing the amounts of these materials to give the same normality of the aqueous liquor in which the cyanobenzylamine is hydrolyzed and the same mole equivalents of the cyanobenzylamine to alkali metal in the solution.

*Example 2.*—p-Cyanobenzylamine was dissolved in about a 4-N solution of potassium carbonate in water to form a solution containing 2 equivalents of potassium for every 1 mole of the cyanobenzylamine. This solution was heated to reflux at atmospheric pressure for 24 hours with nitrogen gas passed over the boiling solution to sweep out the evolved ammonia. Water was added to adjust the volume of the resulting solution to about 1.8 times that of the potassium carbonate solution used in preparing the initial reaction mixture, and solid carbon dioxide was added to cool this solution to about 10° C. and to saturate it with $CO_2$ under atmospheric pressure. Benzylamine-4-carboxylic acid monohydrate precipitated out and was filtered from the mother liquor, which had a pH of about 7.5. A yield of about 46.5% of the benzylamine-4-carboxylic acid, melting point 355°–357° C., was thus recovered. Carbonation of the mother liquor at 20°–25° C. with carbon dioxide under 100–180 p.s.i.g. $CO_2$ resulted in the precipitation of an additional 20% yield of benzylamine-4-carboxylic acid monohydrate.

This same process was repeated except that the reaction product was carefully neutralized by hydrochloric acid to a pH of 7.0 instead of being carbonated. An 80% yield of benzylamine-4-carboxylic acid monohydrate was thus obtained.

This recovery of the amino acid by precipitation with hydrochloric acid instead of by the carbonation procedure of our invention, results in the loss of the hydrolyzing agent. The alkali supplied to the process is all converted to a chloride salt and hence is no longer reuseable in the process. Furthermore, by recycling the mother liquor separated from the amino acid precipitated by carbonating the reaction product, as in our preferred recycle process of Example 1, the benzylamine-4-carboxylic acid produced by the hydrolysis reaction is recovered in higher yields and with practically no loss of the hydrolyzing agent.

*Example 3.*—The procedure of Example 2 above was repeated, substituting an equivalent amount of sodium carbonate for the potassium carbonate. Precipitating the benzylamine-4-carboxylic acid by means of Dry Ice, the benzylamine-4-carboxylic acid recovered amounted to a 12.4% yield.

*Example 4.*—p-Cyanobenzylamine was dissolved in a 2-N solution of potassium bicarbonate in water to form a solution containing 1 equivalent of potassium for every 1 mole of the p-cyanobenzylamine. This solution was treated in the manner described above in Example 2 for conversion of the p-cyanobenzylamine to the alkali metal salt of benzylamine-4-caboxylic acid and recovery of the acid from solution in the form of its monohydrate by carbonation of its salt solution. Addition of solid carbon dioxide to cool and carbonate the solution gave about a 50% yield of the precipitated amino acid monohydrate. Carbonation of the mother liquor separated from this first precipitate, with carbon dioxide gas under 100–180 p.s.i. $CO_2$ pressure at 20°–25° C. resulted in the recovery of an additional 20% yield of benzylamine-4-carboxylic acid monohydrate precipitate.

*Example 5.*—A solution of 1 mole weight of m-cyanobenzylamine dissolved in a solution of potassium carbonate containing ½ a mole weight of $K_2CO_3$ in 750 weight parts of water was prepared. This gave a solution of about 1.33-N $K_2CO_3$ containing 1 equivalent of the alkali metal for every 1 mole of the m-cyanobenzylamine. The solution was heated for 5 hours with stirring in a closed autoclave at 130°–135° C. under autogenous vapor pressures of the reaction mixture ranging from about 40 to 60 p.s.i.g. The autoclave was then vented to about atmospheric pressure and water, amounting to about ⅓ of the water in the initial solution, was distilled out accompanied by ammonia. Ammonia was flushed from the gas phase in the autoclave with nitrogen gas and the autoclave was again closed and the reaction mixture heated for 1 hour at 135°–140° C. under its autogenous vapor pressures.

The reaction product was carbonated with carbon dioxide at about 25° C. under $CO_2$ gas pressures of about 115 p.s.i.g. to about 195 p.s.i. and seeded with crystals of benzylamine-3-carboxylic acid. A precipitate of benzylamine-3-carboxylic acid was thus obtained which was separated from its mother liquor and dried. A 25.2% yield of benzylamine-3-carboxylic acid was recovered. By carefully neutralizing the mother liquor with hydrochloric acid an additional 28% yield of benzylamine-3-carboxylic acid was recovered.

*Example 6.*—A reaction mixture of the same composition as that employed in Example 5 was prepared and heated to reflux at atmospheric pressure for 24 hours while nitrogen gas was passed over the boiling solution to sweep out the evolved ammonia. Water was added to adjust the volume of the resulting solution to about 1.8 times that of the potassium carbonate solution used in preparing the initial reaction mixture.

The solution thus obtained was carbonated and cooled by addition of solid carbon dioxide to obtain a precipitate of the benzylamine-3-carboxylic acid which was separated from its mother liquor and dried. A 15% yield of benzylamine-3-carboxylic acid having a melting point of 275–7° was obtained. Carbonation of the mother liquor separated from this product under 100–180 p.s.i.g. $CO_2$ pressure at 20°–25° C. gave an additional precipitate of the benzylamine-3-carboxylic acid which was recovered in a 30% yield.

*Example 7.*—Repeating the procedure of Example 6, except that sodium carbonate was added to the solution of m-cyanobenzylamine, carbonation of the reaction product by addition of Dry Ice gave about 10% yield of recovered benzylamine-3-carboxylic acid. Further carbonation of the mother liquor separated from this Dry Ice precipitated benzylamine carboxylic acid, employing carbon dioxide under 100–180 p.s.i.g. $CO_2$ pressure and with the mother liquor at 20°–25° C., gave an additional recovery of benzylamine-3-carboxylic acid amounting to a 25% yield. This material had a melting point of 275–7° C.

We claim:

1. The process which comprises heating at about 90° C. to about 200° C., under pressures which are at least about atmospheric, a solution of cyanobenzylamine in at least about 0.1-N aqueous solution of an alkali containing 0.5 to 10 equivalents of alkali metal from the group consisting of sodium and potassium for every one mole of the cyanobenzylamine, carbonating the resulting solution of alkali metal salt of benzylamine carboxylic acid with carbon dioxide, thereby precipitating benzylamine carboxylic acid, and separating the resulting precipitate of benzylamine carboxylic acid from the mother liquor containing the bicarbonate of the alkali metal.

2. The process of claim 1 in which the cyanobenzylamine is a member of the group consisting of the meta- and para-cyanobenzylamines and the solution of the alkali metal salt of the benzylamine carboxylic acid is saturated with carbon dioxide at a temperature in the range 0° C. to 80° C. under a pressure of at least 1 p.s.i.g. $CO_2$.

3. The process of claim 1 in which the solution of the alkali metal salt of the benzylamine carboxylic acid is saturated at a temperature in the range 10° C. to 25° C. with carbon dioxide under a pressure of at least 1 p.s.i.g. $CO_2$ gas.

4. The process which comprises the steps of (1) heating at about 90° C. to about 200° C. under pressures which are at least about atmospheric, a solution of cyanobenzylamine in at least about 0.1-N aqueous solution of an alkali containing 0.5 to 10 equivalents of alkali metal from the group consisting of sodium and potassium for every 1 mole of the cyanobenzylamine, thereby producing a solution of alkali metal salt of benzylamine carboxylic acid, (2) carbonating said solution of alkali metal salt acid with carbon dioxide, thereby precipitating a benzylamine carboxylic acid, and (3) separating from the precipitated benzylamine carboxylic acid the resulting mother liquor containing in solution alkali metal bicarbonate, and in repeating said three steps, incorporating the mother liquor separated from benzylamine carboxylic acid in step 3 in the solution of cyanobenzylamine in aqueous alkali solution which is heated in step 1.

5. The process of claim 4 in which the solution of cyanobenzylamine in the aqueous solution of alkali is heated under its autogenous pressure at about 130° C. to about 150° C.

6. The process of claim 4 in which the aqueous solution of alkali is about 0.5-N to 5-N and contains 1 to 2 equivalents of the alkali metal for every 1 mole of cyanobenzylamine present, and the solution is heated under its autogenous pressure at about 130° C. to about 150° C.

7. The process of claim 4 in which the cyanobenzylamine is a member of the group consisting of the meta- and para-cyanobenzylamines.

8. The process of claim 7 in which the alkali metal is potassium.

References Cited in the file of this patent

UNITED STATES PATENTS 2,128,684    Vollmann et al.  ---------- Aug. 30, 1938

OTHER REFERENCES

Horning: "Organic Syntheses," vol. III, p. 34 (1955).